(12) United States Patent
Uszkoreit et al.

(10) Patent No.: US 9,489,378 B1
(45) Date of Patent: *Nov. 8, 2016

(54) PARSING RULE GENERALIZATION BY N-GRAM SPAN CLUSTERING

(71) Applicant: Google Inc., Mountain View, CA (US)

(72) Inventors: Jakob D. Uszkoreit, San Francisco, CA (US); Ashish Venugopal, Jersey City, NJ (US); Daniel M. Bikel, Mount Kisco, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,112

(22) Filed: Jul. 6, 2015

Related U.S. Application Data

(63) Continuation of application No. 13/926,591, filed on Jun. 25, 2013, now Pat. No. 9,092,505.

(51) Int. Cl.
*G06F 17/30* (2006.01)
*G06F 17/28* (2006.01)
*G06F 17/27* (2006.01)

(52) U.S. Cl.
CPC ........... *G06F 17/28* (2013.01); *G06F 17/2705* (2013.01); *G06F 17/30713* (2013.01)

(58) Field of Classification Search
USPC ....................................................... 707/737
See application file for complete search history.

(56) References Cited

U.S. PATENT DOCUMENTS

| | | |
|---|---|---|
| 5,212,821 A | 5/1993 | Gorin |
| 5,797,123 A | 8/1998 | Chou |
| 6,826,559 B1 | 11/2004 | Ponte |
| 8,666,976 B2 | 3/2014 | Merz |
| 8,849,693 B1 | 9/2014 | Koyfman |
| 8,935,249 B2 | 1/2015 | Traub |
| 8,935,252 B2 | 1/2015 | Lamba |
| 9,026,535 B2 | 5/2015 | Jakubik |
| 2006/0190261 A1 | 8/2006 | Wang |

(Continued)

FOREIGN PATENT DOCUMENTS

| | | |
|---|---|---|
| EP | 834862 A3 | 12/1998 |
| WO | WO0014727 A1 | 3/2000 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.

(Continued)

*Primary Examiner* — Cam-Linh Nguyen
(74) *Attorney, Agent, or Firm* — Fish & Richardson P.C.

(57) ABSTRACT

A method includes accessing command sentences stored in a data store, wherein each command sentence is a collection of n-grams and each command sentence includes at least one n-gram that is a non-terminal n-gram that maps to a non-terminal type, and wherein the command sentences include non-terminal n-grams that collectively map to a plurality of different non-terminal types; for each of the non-terminal types: identifying n-gram spans; determining clusters of the n-gram spans, each cluster including n-gram spans meeting a measure of similarity of n-grams spans that belong to the cluster; and for each cluster of n-gram spans, determining, from the n-gram spans belonging to the cluster, a new non-terminal type to which the terminal n-grams of the n-gram spans map.

17 Claims, 7 Drawing Sheets

(56) References Cited

U.S. PATENT DOCUMENTS

2012/0290509 A1 11/2012 Heck
2013/0185328 A1 7/2013 Yoo

OTHER PUBLICATIONS

Chen et al., "Diverse Topic Phrase Extraction from Text Collection" WWW 2006, 9 pages.
Gorin et al., "An Experiment in Spoken Language Acquisition", IEEE Transactions on Speech and Audio Processing, 2 (1)(II), 1994, pp. 224-240.
Gupta et al., "Segmenting Spoken Language Utterances Into Clauses for Semantic Classification" in Automatic Speech Recognition and Understanding (ASRU 2003), 2003 IEEE Workshop, pp. 525-530.
Kawahara et al., "Topic Independent Language Model for Key-Phrase Detection and Verification", Acoustics, Speech, and Signal Processing, 1999, 1999 IEEE International Conference, pp. 685-688.
Krulwich et al., "Learning user information interests through the extraction of semantically significant phrases" AAAI Technology Report SS-96-05, Compilation, pp. 110-112.
Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.
Lehuen et al., "A Robust Semantic Parser Designed for Spoken Dialog Systems" in 2010 IEEE Fourth International Conference on Semantic Computing (ICSC), 2010, pp. 52-55.
Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cm.edu/~ananlada/SennanticRoleLabelingASRU05.pdf.
Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng_ASRU2001_NLU.pdf.
Wu et al., "KIP: A Keyphrase Identification Program with Learning Functions" in Proceedings of the International Conference on Information Technology: Coding and Computing (ITCC'04), vol. 2, 5 pages.
Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

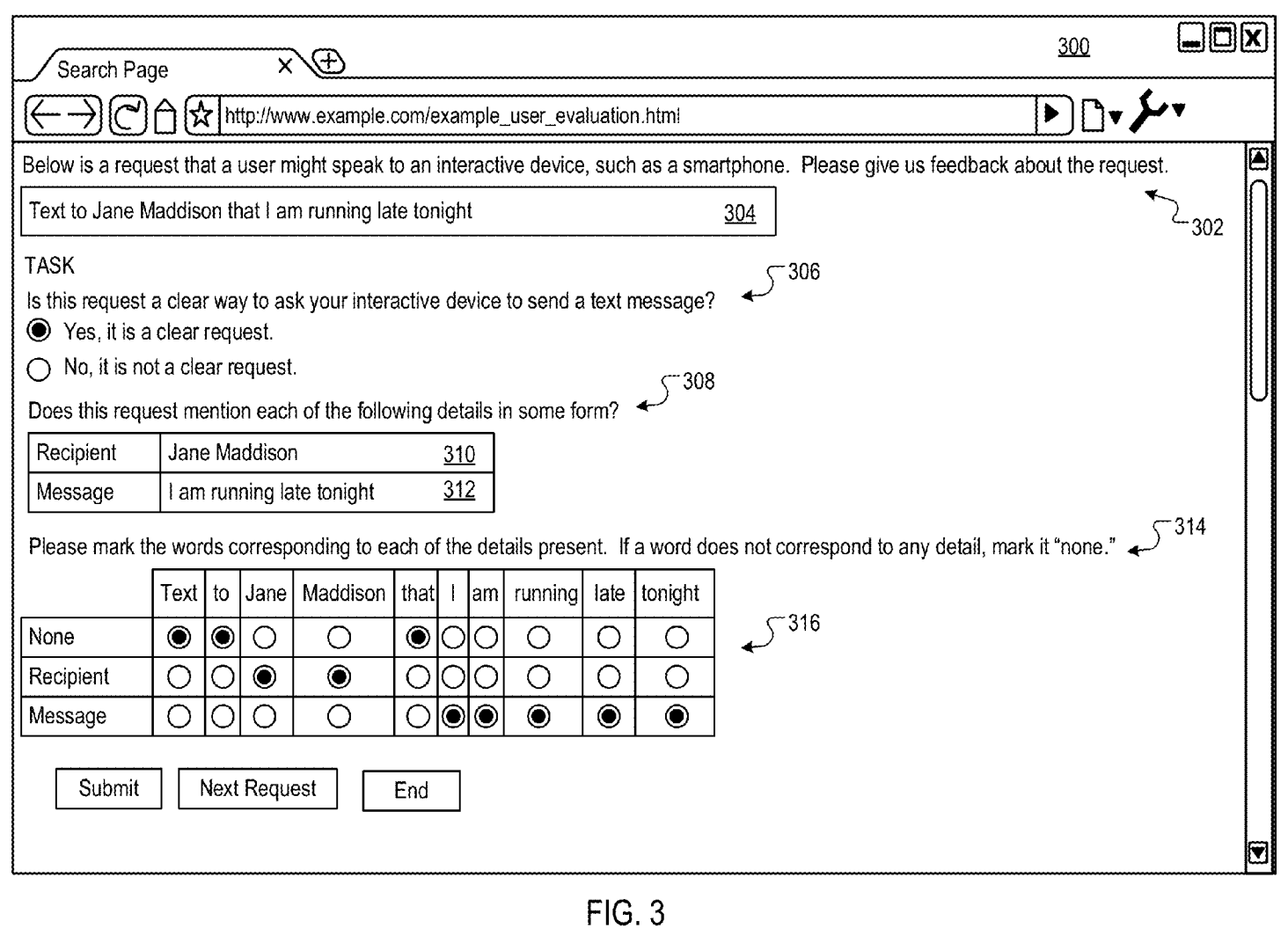

Below is a request that a user might speak to an interactive device, such as a smartphone. Please give us feedback about the request. ↙302

Text to Jane Maddison that I am running late tonight    304

TASK  ↙306

Is this request a clear way to ask your interactive device to send a text message?
● Yes, it is a clear request.
○ No, it is not a clear request.

Does this request mention each of the following details in some form?  ↙308

| Recipient | Jane Maddison            | 310 |
| Message   | I am running late tonight | 312 |

Please mark the words corresponding to each of the details present. If a word does not correspond to any detail, mark it "none."  ↙314

↙316

|           | Text | to | Jane | Maddison | that | I | am | running | late | tonight |
|-----------|------|----|------|----------|------|---|----|---------|------|---------|
| None      | ●    | ○  | ○    | ○        | ○    | ○ | ○  | ○       | ○    | ●       |
| Recipient | ○    | ●  | ●    | ●        | ○    | ○ | ○  | ○       | ○    | ○       |
| Message   | ○    | ○  | ○    | ○        | ●    | ● | ●  | ●       | ●    | ●       |

Submit    Next Request    End

FIG. 3

PARSING RULE GENERALIZATION BY N-GRAM SPAN CLUSTERING

CROSS-REFERENCE TO RELATED APPLICATIONS

This application is a continuation application of, and claims priority to, U.S. patent application Ser. No. 13/926,591, titled "Parsing Rule Generalization By N-Gram Span Clustering," filed on Jun. 25, 2013. The disclosure of the foregoing application is incorporated herein by reference.

BACKGROUND

This specification relates to speech recognition and speech understanding systems.

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

A user device uses a speech recognition processing system to recognize and process speech commands. A provider of the speech recognition and processing system develops parsing rules for various commands a user will speak Upon a successful parse of a command input by a rule, an action associated with the rule is performed (or may be performed subject to user confirmation). There are, however, many possible parses of an input sentence, and thus developing the parsing rules can be resource intensive.

SUMMARY

In general, one innovative aspect of the subject matter described in this specification can be embodied in methods that include the actions of accessing command sentences stored in a data store, wherein each command sentence is a collection of n-grams and each command sentence includes at least one n-gram that is a non-terminal n-gram that maps to a non-terminal type, and wherein the command sentences include non-terminal n-grams that collectively map to a plurality of different non-terminal types; for each of the non-terminal types: identifying n-gram spans, each n-gram span being a proper subset of a set of n-grams that constitute a command sentence and including a non-terminal n-gram of the non-terminal type and one or more terminal n-grams that do not map to a non-terminal type; determining clusters of the n-gram spans, each cluster including n-gram spans meeting a measure of similarity of n-grams spans that belong to the cluster; for each cluster of n-gram spans, determining, from the n-gram spans belonging to the cluster, a new non-terminal type to which the terminal n-grams of the n-gram spans map. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. N-gram spans that are consumed by contextually similar terminals and non-terminals in parse rules are clustered. For the cluster, a new non-terminal type is created for the terminals, and the terminals are mapped to this new non-terminal type. The portions of the parse rules that consume the n-gram spans of the cluster are then updated by replacing the terminals with the new non-terminal type. The resulting parsing rules are more generalized, and thus more robust with respect to consumption of command input sentences.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an illustration of a user interface for classifying n-grams of a proposed command input.

Like reference numbers and designations in the various drawings indicate like elements.

DETAILED DESCRIPTION

Overview

Figure 1:
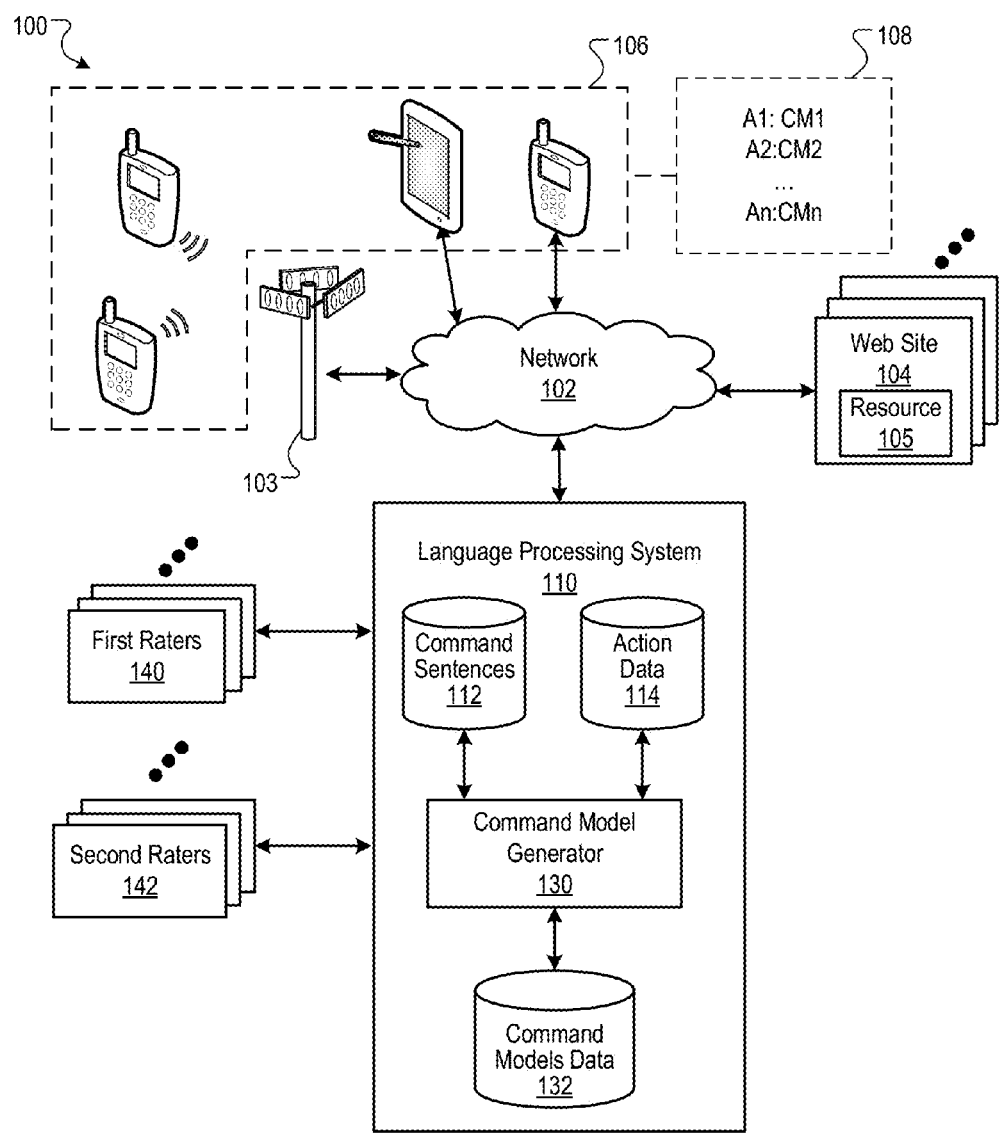
FIG. 1 is a block diagram of an environment in which parsing rules generated from a parsing rule generation process are generalized using n-gram span clustering.

A system generalizes parsing rules for parsing input sentences. The parse is used to determine whether the input sentence invokes a specific action, and if so, what arguments are to be passed to the invocation of the action.

The system can generate the rules or receive a set of rules that have been generated by a process external to the system. In the example described below, the system includes a process the first generates the parsing rules. The parsing rules that are generated are also generalized prior to storing in a command model.

To generate the rules, the system implements two data collections for each action in a set of actions. In the first collection, the system provides a first user interface to user devices. The first user interface includes a first task definition, a first set of non-terminal fields, and a command sentence input field. The first task definition describes a first user task to generate a command sentence for an action. Each non-terminal field lists a non-terminal type and terminals that parses to the non-terminal type. The terminals may be example arguments for the action, and the non-terminal types are variables. For example, for a texting action, the non-terminal types may be "Recipient" and "Message," and the terminals may a name of an example recipient, and an example text message. The command sentence input field is a field in which a user inputs a user-generated command sentence in accordance with the first user task described by the first task definition. The data input by the users for the first collection are collected by the system.

In the second collection, the system provides a second user interface to user devices. The second user interface includes one of the user-generated command sentences, a first set of non-terminal fields, and a second task definition. The user-generated command sentence is one selected from the received user-generated command sentences. The first set of non-terminal fields each list the non-terminal type and the terminal that parses to the non-terminal type. For example, as described above, the non-terminal types may be "Recipient" and "Message," and the terminals may be the name of an example recipient, and the example text message. The second task definition describes a second user task to classify each of the terms (e.g., n-grams) of the command sentence as belonging to one of the non-terminal types in the set of non-terminal types, or none of the non-terminal types in the set of non-terminal types. The data input by the users for the second collection are collected by the system.

For each action, the data received from the second collection are used generate parsing rules for the action. Each of the parsing defines non-terminals of each of the non-terminal types and at least one terminal. The parsing rules include terminals and non-terminals that consume n-grams of a command input sentence. In a command input sentence, a terminal n-gram is an n-gram that does not map to a non-terminal in a parse rule, and a non-terminal n-gram is an n-gram that maps to a non-terminal in a parse rule.

The system identifies contextual similarities of n-gram spans that include a terminal n-gram and a non-terminal n-gram that is consumed by a parse rule. An n-gram span is a set of n-grams in a command input sentence that includes a terminal n-gram and a non-terminal n-gram. Based on similarity measures, similar n-gram spans are clustered together. Each cluster includes n-gram spans that are consumed by contextually similar terminals and non-terminals in parse rules. A new non-terminal type is created for the terminals, and the terminals are mapped to this new non-terminal type. The portions of the parse rules that consume the n-gram spans of the cluster are then updated by replacing the terminals with the new non-terminal type. The resulting parsing rules are more generalized, and thus more robust with respect to consumption of command input sentences.

The parsing rules are then provided to user devices, which then use the parsing rules to parse input sentences to determine whether an input sentence invokes a particular action.

Example Environment

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

In addition to providing content, particular websites 104 may also provide one or more services. Example services include a search service provided by a search engine, video serving provided by video hosting servers, a mapping service providing by a map server, and so on.

A user device 106 is an electronic device that is under the control of a user and is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. An example mobile user device 106, such as a smart phone, is described with reference to FIG. 7 below. The user devices 105 may communicate over the networks 102 and 103 by means of wired and wireless connections with the networks 102 and 103.

Figure 7:
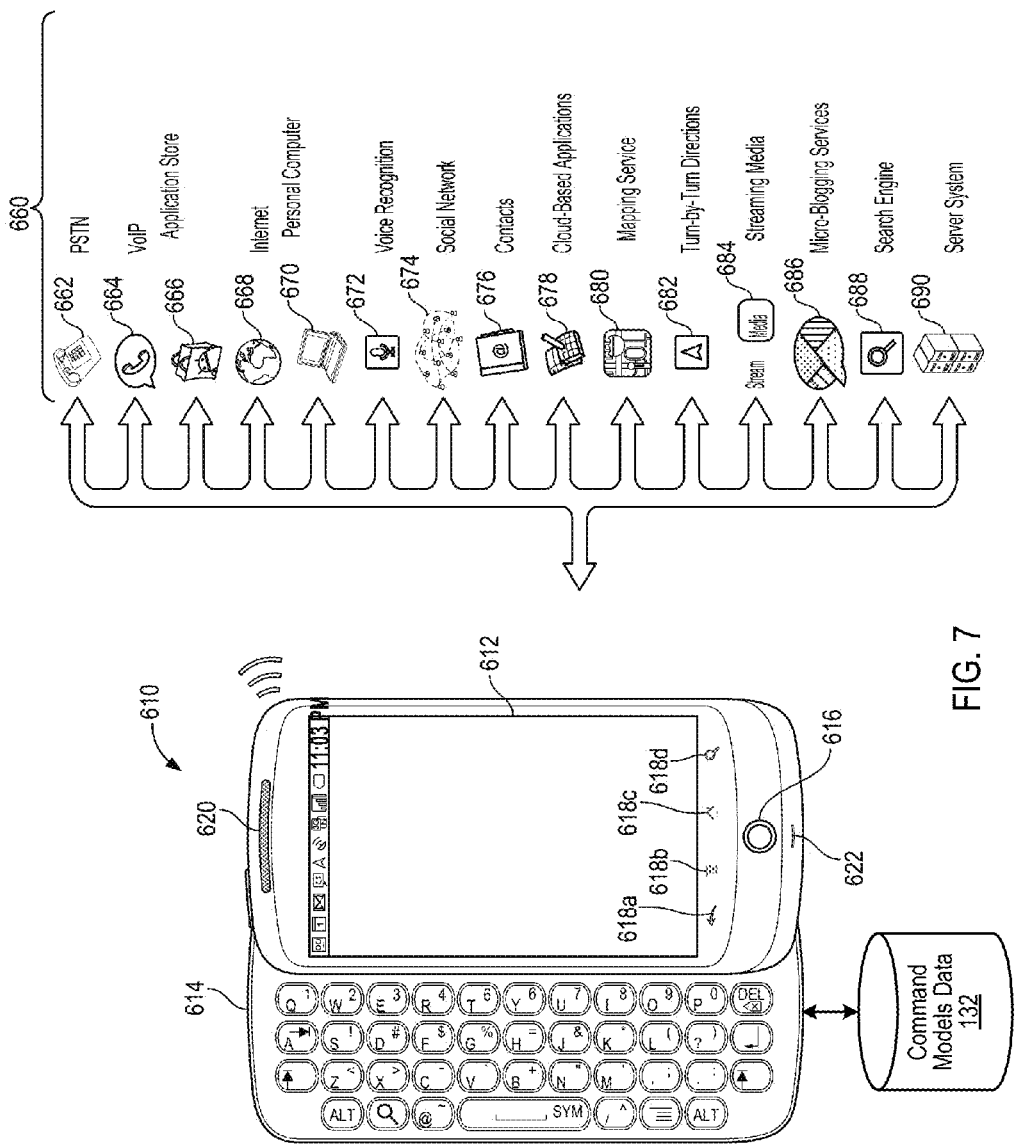
FIG. 7 is a block diagram of an example mobile computing device.

As described with reference to FIG. 7, a user device may be able to perform a set of device actions for various programs and capabilities. The actions may differ from each other for each action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. The actions may be performed entirely by the user device, e.g., in the case of placing a phone call, or the user device may invoke an external service to perform the action, e.g., a map service or a search engine service. In some implementations, the user device 106 utilizes a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action.

As will be described in more detail below, each action A1, A2 . . . An has a corresponding command model CM1, CM2 . . . CMn, as indicated by the phantom box 108. The user device 106 utilizes the command models CMx to determine which, if any, actions are invoked in response to a voice input. As will be described in more detail the below, the command models are, in some implementations, grammars that describe sentence structures for particular commands. Other appropriate command models may also be used.

In some implementations, a language processing system 110 is used to generate command models data 132 that associates actions with corresponding command models by use of parsing rules. The command models data 132 store command models for actions that are respectively generated from user input data collected from crowdsourcing techniques described in more detail below. In some implementations, the command models are each configured to generate an action score for an action for an input sentence based on, for example, a semantic meaning of the input sentence.

As used in this specification, "command input" or "command input sentence" can be an input sentence, a query, or any other input that has one or more terms. The input does not need to be a grammatically correct and complete sentence, e.g., it need not have both a predicate and a subject. For example, the following input would constitute a command input, but would not constitute a grammatically complete sentence: "Images of lions." A command input need not have an associated parsing rule, nor have annotations or other data describing terms of the command input. The language processing system, in some implementations, can process command inputs to generate a parsing rule and provide such annotations. In general, any input of one or more terms can be a command input, regardless of whether the particular command input is associated with other language processing data, such as parsing rules, parts of speech tagging, etc.

An example language processing system 110 includes a command model generator 130. The example architecture is illustrative only, and other appropriate functional architectures can also be used. The language processing system 110 learns, from a set of command sentences for a set of actions and from user feedback for each of the sentences, terms and phrases for each sentence that are terms that are categorized as one of non-terminals or terminals. From these categorizations, command model generator 130 generates a parsing rule for each sentence, and the generated parsing rules corresponds to a particular action with which the sentence is associated.

The parsing rules are generalized by identifying contextually similar n-gram spans in the in the command input sentences. The portions of the parsing rules that consume these n-gram spans are updated with new non-terminals in place of terminals, and the non-terminals map to the terminals that are replaced. Thus, the resulting parsing rules are generalized such that they will successfully parse command inputs that are not in the data set from which the parsing rules were generated.

The command models are then provided to user devices. At run time, when an input sentence needs to be understood at a user device, the parsing rules of the command model are used to parse the input sentences to determine which, if any, actions may be invoked for a particular sentence.

Parsing Rule Generation

Figure 2:
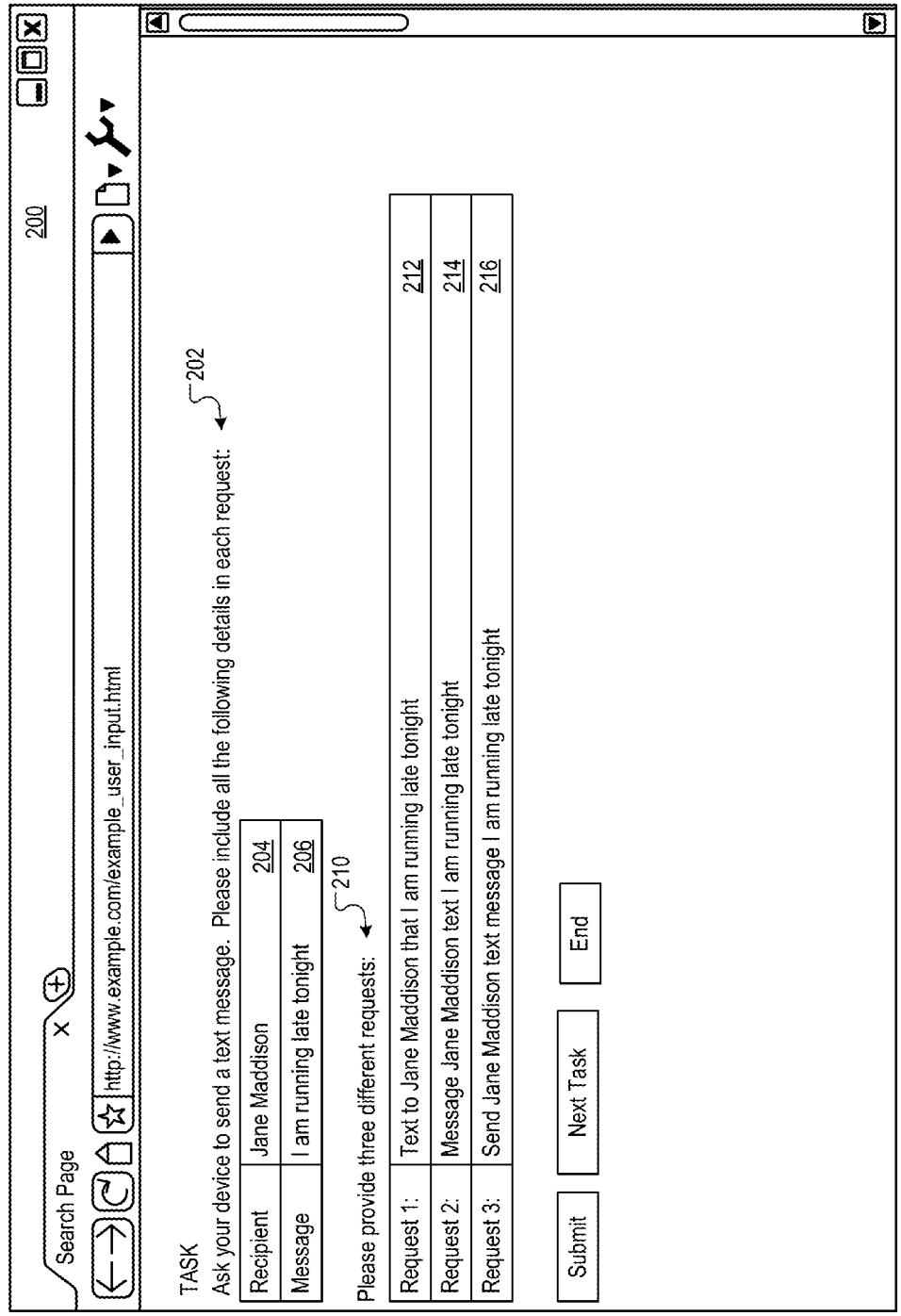
FIG. 2 is an illustration of a user interface for inputting proposed command inputs.

As described above, the system 110 implements two data collections for each action in a set of actions. In the first data collection, the system 110 provides a first user interface to first user devices to collect data for proposed action queries. The first user devices are operated by first raters 140, which are persons that agree to perform the tasks outlined in the first user interface. FIG. 2 is an illustration of a user interface 200 for inputting proposed action queries. In the second data collection, the system provides a second user interface to second user devices operated by second raters 142. The second user interface facilitates the collation of data classifying the n-grams of the command sentence as either non-terminals or terminals. FIG. 3 is an illustration of a user interface for classifying n-grams of a proposed command input.

Figure 4:
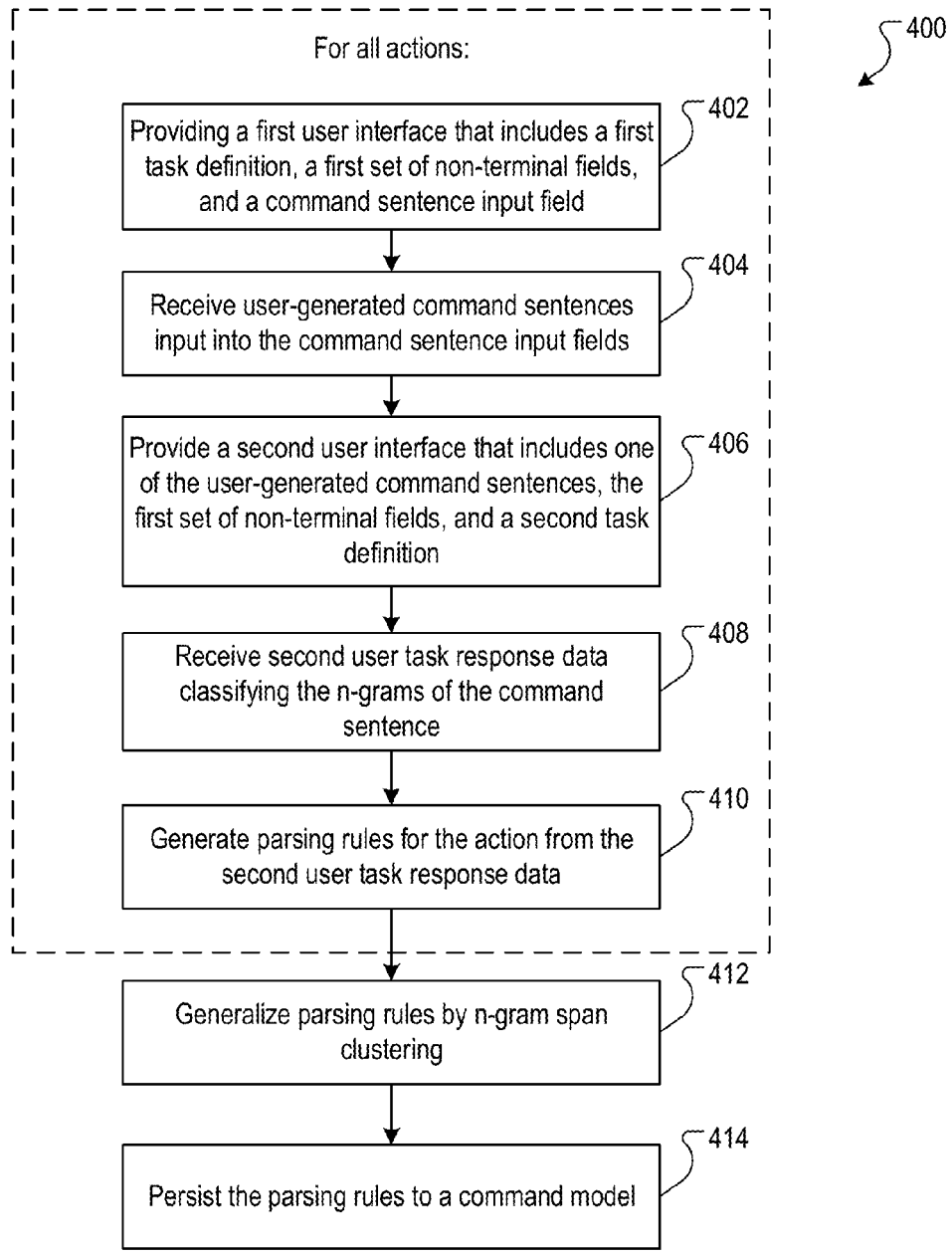
FIG. 4 is a flow diagram of an example process for generating parsing rules from proposed command inputs.

Collection of data through the user interfaces 200 and 300, and the processing of the collected data to generate the command model data 132, is described with respect to the process 400 of FIG. 4. The command model generator 130 accesses action data 114 that specifies particular actions for various applications. Each action defines user device operation that is different from user device operations for each other action. Example actions include a "call" action that places a phone call to a contact; a "text" action that sends a text message to a contact; a "map" action that maps a location; an "e-mail" action that sends an e-mail to a contact; and so on. The action data 114 may also have, for each action, example arguments for each action. These example arguments are provided to the raters as part of the tasks they perform.

For each action, the language processing system 110 provides a first user interface 200 that includes a first task definition, a first set of non-terminal fields, and a command sentence input field (402). FIG. 2 illustrates an example first user interface with the first task definition as outlined by instructions 202, and 210, a first set of non-terminal fields 204 and 206, and instructions 210 for inputting proposed action queries for command sentence input fields 212, 214 and 216.

The first task definition 202 describes a first user task to generate a command sentence for an action. For example, as shown in FIG. 2, the first task is described as instructing a user device to send a text message that reads "I am running late tonight" to a recipient, Jane Maddison.

The first set of non-terminal fields list a non-terminal type and a terminal that parses to the non-terminal type. For example, for the fields 204, the non-terminal of a first type listed is "Recipient," and the terminal is "Jane Maddison." For the fields 206, the non-terminal of a second type listed is "Message," and the terminal is "I am miming late tonight." The non-terminal is an object that can be replaced by a terminal in a grammar.

The instructions 210 instruct the rater to input three different user-generated requests in the command sentence input fields 212, 214 and 216. Here, the user has input the three example requests shown in FIG. 2. Each request includes the recipient, "Jane Maddison," the message "I am running late tonight," and other text or words that the rater input to create the different requests.

After entering the proposed command inputs, the rater can select the "Submit" button, which, in turn, causes the system 110 to receive the user-generated command sentences input into the command sentence input fields (404). The user can then select the "Next Task" button to receive another task. The next task may relate to the same action, e.g., specify another recipient and message, or may relate to a different action, e.g., requesting a map route. For example, a map route request may have "Starting Location" non-terminal, a "Destination" non-terminal, etc.

The received data are stored in the command sentences data 112. By use of multiple raters 140, the system 110 collects a large set of command sentences for each action. The command sentences are then selected and each is provided to other raters 142. The raters 140 and 142 may be different sets of raters, or, alternatively, may be the same raters. In the case of the latter, a particular rater 140/142 is not provided with a command sentence that he or she generated for evaluation.

The system 110 provides a second user interface 300 that includes one of the user-generated command sentences 304, the first set of non-terminal fields 310 and 312, and a second task definition 302 as outlined by instructions 302, 308, and 314 (406). Any particular command sentence may be selected multiple times and provided to different raters 142 for evaluation.

The instructions 306 instruct the user to evaluate whether the command sentence 304 is a clear instruction for asking an interactive device to perform a task to which the sentence corresponds. Should the user select the "Yes" radio button, further evaluation may take place. Conversely, should the user select the "No" radio button, the evaluation of the command sentence 304 is complete. In FIG. 3, the user has selected the "Yes" radio button.

The non-terminal fields 310 and 312 each list a non-terminal type and a terminal that parses to the non-terminal type. For example, for the fields 310, the non-terminal of a first type listed is "Recipient," and the terminal is "Jane Maddison." For the fields 312, the non-terminal of a second type listed is "Message," and the terminal is "I am miming late tonight."

The instructions 308 instruct the user to classify each n-gram of the command sentence as belonging to one of the first set of non-terminal fields or none of the non-terminal types in the set of non-terminal types. The classifications can be made by use of a classification grid 316 that provides respective rows for the non-terminal type classifications and the "none" classification, and columns for each n-gram. The rater has selected the following classifications:

None: Text, to, that
Recipient: Jane, Maddison
Message: I, am, running, late, tonight The rater can select the "submit" button, which causes the user device to send the task response data to the system 110, which receives the second user task response data classifying the n-grams of the command sentence (408). The rater can then select another sentence by selecting the "Next Request" button, or end the session by selecting the "End" button.

The system stores the task response data with the command sentences 112, and then generates command grammars for the action from the second user task response data (410). In some implementations, a command grammar is generated for each set of task response data for each sentence. For example, for the sentence 304 of FIG. 3, the resulting command grammar may be of the form:

$$G=<T,N,S,R>;$$

where:
T={Text, to, Jane, Maddison, that, I, am, running, late, tonight}
N={Recipient, Message}
S=S
R={
S→Text to <Recipient> that <Message>
Recipient→Jane Maddison
Message→that, I, am, running, late, tonight
}

Because the terminals and non-terminals have been defined according to the specific task for the sentence, each rater need not be familiar with the general construction of grammars. However, by classifying the n-grams of each command sentence according to corresponding non-terminal types or terminals (the latter being a "none" classification), the user provides the necessary classification by which the command model generator 130 can generate a corresponding grammar. In particular, each of the command grammar defines non-terminals of each of the non-terminal types (e.g., <Jane Maddison> for the non-terminal Recipient, <I, am, miming, late, tonight> for the non-terminal Message), and terminals selected by the user (e.g., <Text, to, that>). Because the terminals and non-terminals are defined by the rater, the rule for the start symbol S can be generated by parsing the command sentence. Thus, for the terminals defined above, a parse of "Text to Jane Maddison that I am running late tonight" would yield:

S→Text to <Recipient> that <Message>

The parsing rules are generalized using n-gram span clustering (412). N-gram spans that are grouped into clusters are used to generalize parsing rules. In particular, portions of parsing rules that consume n-gram spans of a cluster are updated with a new non-terminal type that maps to terminals that are replaced by the new non-terminal types. An example process for generalizing parsing rules is described with reference to FIGS. 5A and 5B below.

The parse rules that are generated are then persisted to the command model data 132 (414). The command model data 132 may then be provided to user devices for use in parsing input commands, such as text input commands and voice input commands.

Generalization of Parsing Rules

Figure 5A:
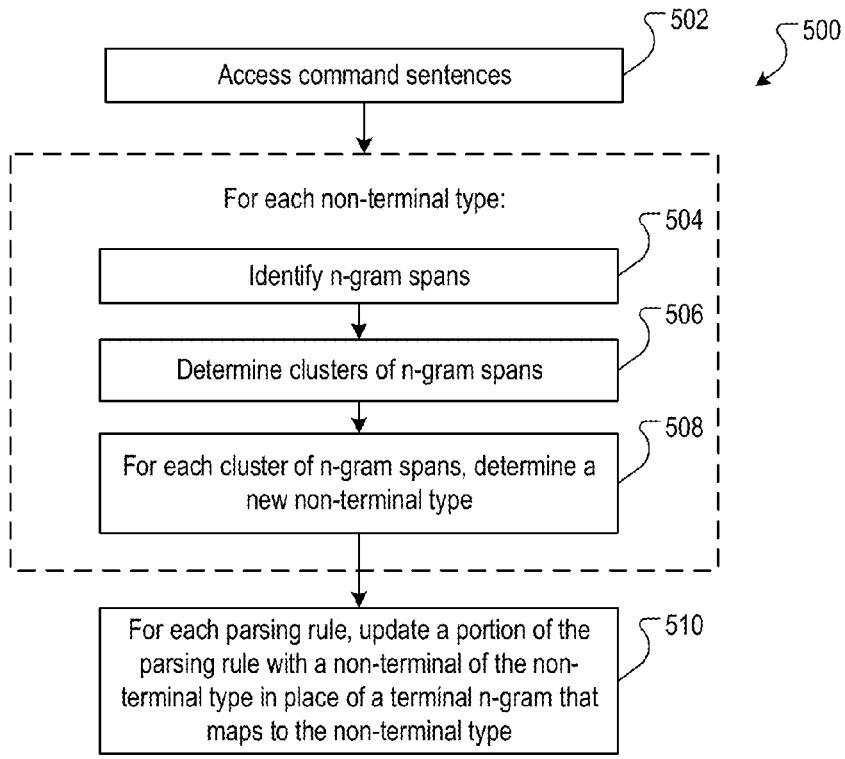
FIG. 5A is a flow diagram of an example process for generalizing parsing rules using n-gram span clustering.
Figure 5B:
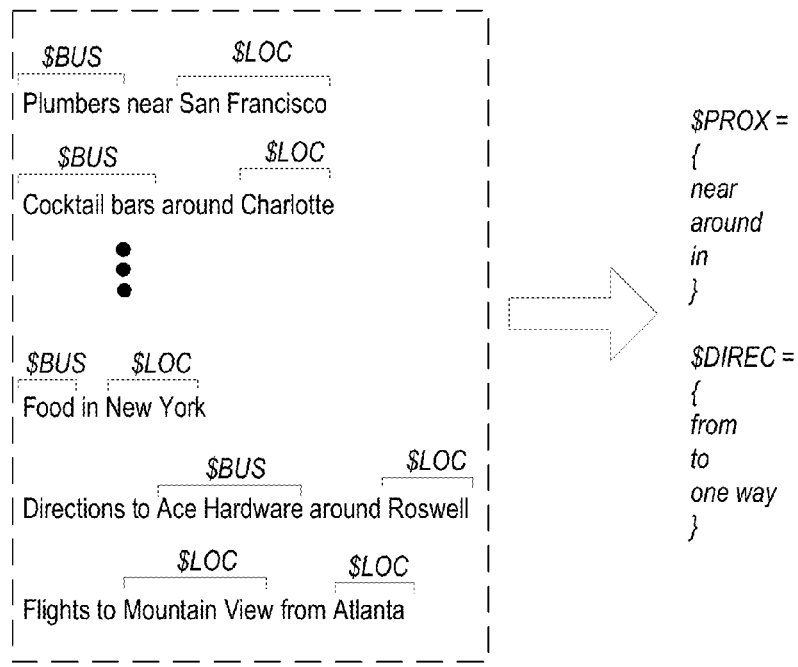
FIG. 5B is an illustration of n-gram spans of command inputs and a resulting generalization of corresponding parsing rules.

FIG. 5A is a flow diagram of an example process 500 for generalizing parsing rules using n-gram span clustering, and FIG. 5B is an illustration of n-gram spans of command inputs and a resulting generalization of corresponding parsing rules. The process 500 of FIG. 5A is described in the context of the n-gram spans of FIG. 5B.

The command model generator 130 accesses command sentences (502). Each command sentence is a collection of n-grams, and each command sentence includes at least one n-gram that is a non-terminal n-gram that maps to a non-terminal type. For example, the command sentences generated above and classified by the raters can be used. Alternatively, command sentences can be received from a process external to the language processing system 100. In yet another implementation, the command sentences can be generated by generating command sentences from a set of parsing rules (e.g., in the case of a grammar, expanding from the start symbol S until a complete sentence is generated, and, for each start symbol, generating all possible command input sentences).

Example command sentences are shown in FIG. 5B. N-grams of a "business" type are annotated with the $BUS non-terminal identifier, and n-grams of a "location" type are annotated with a $LOC non-terminal identifier. The remaining n-grams are terminal n-grams that do not map to a non-terminal type in the rules.

For each of the non-terminal types, the command model generator 130 identifies n-gram spans (504). Each n-gram span is a proper subset of a set of n-grams that constitute a command sentence and includes a non-terminal n-gram of the non-terminal type and one or more terminal n-grams that do not map to a non-terminal type. In particular, each n-gram span is a proper subset of n-grams consumed by a portion of a parsing rule. For example, assume the following parsing rules exist:

S→<$BUS> near <$LOC>
S→<$BUS> around <$LOC>
S→<$BUS> in <$LOC>
S→Directions to <$BUS> around <$LOC>
S→Flights to <$LOC> from <$LOC>

Accordingly, in FIG. 5B, example n-gram spans for the non-terminal type $LOC include:

near San Francisco
around Charlotte
in New York
around Roswell
to Mountain View
from Atlanta Likewise, a partial list example n-gram spans for the non-terminal type $Bus include:

Plumbers near
Cocktail bars around
Food in
Ace Hardware around
directions to Ace Hardware
to Ace Hardware
to Ace Hardware around
to Mountain View
Mountain View from
Flights to Mountain View . . . .

The above list of n-grams spans is not a complete list.

For each non-terminal type, the command model generator 130 determines clusters of n-gram spans (506). Each cluster includes n-gram spans meeting measure of similarity of n-grams spans that belong to the cluster. In some implementations, the n-gram spans must include the same non-terminal type to be considered to be included in the same cluster; n-gram spans with different non-terminal types are considered to be dissimilar. For example, the n-gram spans for the non-terminal type $LOC are eligible to be included in a single cluster, and the n-gram spans for the non-terminal type $BUS are also eligible to be included and a single cluster. However, n-grams spans for both non-terminal types $LOC and $BUS cannot both be included in the same, single clusters.

Furthermore, n-gram spans identified in command inputs for different actions can be included in the same cluster, as long as each n-gram span is for the same non-terminal type. For example, assume the command input [Flights to Mountain View from Atlanta] is successfully parsed by a parsing rule for a "Flight Reservation" action, and the command input [Directions to Ace Hardware around Roswell] is successfully parsed by a parsing rule for a "Mapping" action. The n-gram spans "around Roswell" and "from Atlanta" are eligible to be included in the same cluster.

A variety of appropriate clustering algorithms can be used to cluster n-gram spans. For example, agglomerative, k-means or other types of clustering algorithms can be used. In some implementations, the clustering of n-gram spans is achieved by selecting pairs of n-grams spans for a non-terminal type, and for each pair, determining a similarity measure that measures the similarity of the n-gram spans in the pair of n-grams spans to each other. All possible pairs of n-gram spans can be measured for similarity. The n-gram spans are then clustered based on the similarity measures.

A variety of similarity metrics can be used to determine a similarity measure between two n-gram spans. For example, the command model generator 130 can determine a frequency count of the n-gram spans in the command sentences. Each time a particular n-gram span is found in the command sentences, the command model generator 130 increments a frequency count for the n-gram span. The frequency count can be based on, for example, the n-gram spam in the context of the terminal and the non-terminal. Thus, the n-gram spans "near San Francisco" and "near Atlanta" would each result in a frequency count increment for an n-gram span type of "near $LOC."

The command model generator 130 can also base the frequency count of the n-gram spans, in part, on a contextual co-occurrence. N-gram spans are contextually co-occurrent when they are used interchangeably in command inputs. For example, for the command inputs [Plumbers near San Francisco] and [Plumbers around San Francisco], the n-gram spans of "near San Francisco" and "around San Francisco" contextually co-occur, as they are used in the same context in two different command inputs.

The command model generator 130 can also use a frequency of action co-occurrence of the n-gram spans in the command sentences as a similarity metric. Each time a particular n-gram span is found in the command sentences that parse to a particular action, the command model generator 130 increments a frequency of action co-occurrence count for the n-gram span. For example, the command input [Flights to Mountain View from Atlanta] parses to a rule associated with a "Flight Reservation" action. The n-gram span "from $LOC' occurs frequently in command sentences associated with the "Flight Reservation" action, and thus has a frequency of action co-occurrence count for "Flight Reservation." However, for other actions, such as search action, the span may occur relatively infrequently. For example, for a business search query, assume users rarely input a command input that parses to the rule "$BUS from $LOC." Thus, the similarity of the two spans will be decreased as a result of disparity of the respective frequency of action co-occurrence counts. This can, for example, reduce the likelihood of merger of n-gram span clusters for a particular non-terminal type that result from n-gram spans for different actions.

Other appropriate similarity metrics can also be used to determine the similarity of n-grams spans.

In an example cluster generation process, the command model generator 130 uses an iterative clustering process to group the n-gram spans into clusters. The command model generator 130 iteratively selects pairs of n-gram spans in an order according to their respective similarity measures until a convergence condition is met. For example, the n-gram pairs can be selected in an order of decreasing similarity, where the first pair of n-gram spans that are selected are the most similar n-grams spans relative to all remaining pairs of n-grams spans; the second pair of n-gram spans that are selection are the second most similar n-grams spans relative to all remaining pairs of n-grams spans; and so on.

After each iterative selection, the command model generator 130 determines whether any of the n-gram spans belonging to the pair of n-gram spans belong to a cluster. The resulting determination will be one of the following—none of the n-gram spans of the pair belong to a cluster; only one of the n-gram spans of the pair belong to a cluster; one of the n-gram spans belong to a first cluster and the other of the n-gram spans belong to a second cluster; or both of the n-gram spans belong to the same cluster.

For each pair of n-gram spans for which none of the n-gram spans of the pair belong to a cluster, the command model generator 130 creates a cluster that includes the n-gram spans of the pair. This typically occurs at the beginning of the clustering process and whenever a pair of n-gram spans are selected that do not belong to any cluster. This operation can be conditioned on the n-gram spans having at least a minimum similarity measure; the n-gram spans that do not have a minimum similarity measure are not used to generate a new cluster.

For each pair of n-gram spans for which only one of the n-gram spans belong to a cluster, the command model generator 130 the other n-gram spans of the pair to the cluster. This operation can likewise be conditioned on the n-gram spans having at least a minimum similarity measure to each other.

For each pair of n-gram spans for which one of the n-gram spans belong to a first cluster and the other of the n-gram spans belong to a second cluster, the command model generator 130 may merging the first and second clusters. Again, this operation can be conditioned on the n-gram spans having at least a minimum similarity measure to each other.

Other clustering techniques can also be used.

After the clusters are generated, the command model generator 130, for each cluster, determines from the n-gram spans belonging to the cluster a new non-terminal type to which the terminal n-grams map (508). For example, assume that from the command inputs of FIG. 5B, one of the clusters that is generated for the location type ($LOC) non-terminal is the following:

near San Francisco
around Charlotte
in New York
around Roswell

The terminal n-grams are "near," "around" and "in." A new non-terminal is generated, e.g., $PROX, and is mapped to the terminal n-grams of the cluster. A similar process is done for other clusters.

For each parsing rule, the command model generator 130 updates a portion of the parsing rule with a non-terminal of the non-terminal type in place of a terminal n-gram that maps to the non-terminal type (510). For example, the terminal n-gram in the portion of the command grammar that consumed an n-gram span that belongs to a cluster is replaced with the new non-terminal type for the cluster. To illustrate, with respect to the example cluster above, the parsing rules above are changed as follows:

S→<$BUS> near <$LOC>→
<$BUS> <$PROX> <$LOC>
S→<$BUS> around <$LOC>→
<$BUS> <$PROX> <$LOC>
S→<$BUS> in <$LOC>→
<$BUS> <$PROX> <$LOC>
S→Directions to <$BUS> around <$LOC>→
Directions to <$BUS> <$PROX> <$LOC>
S→Flights to <$LOC> from <$LOC>

Because the first three parsing rules are now the same, the set reduces to:

S→<$BUS> <$PROX> <$LOC>
S→Directions to <$BUS> <$PROX> <$LOC>
S→Flights to <$LOC> from <$LOC>

Figure 6:
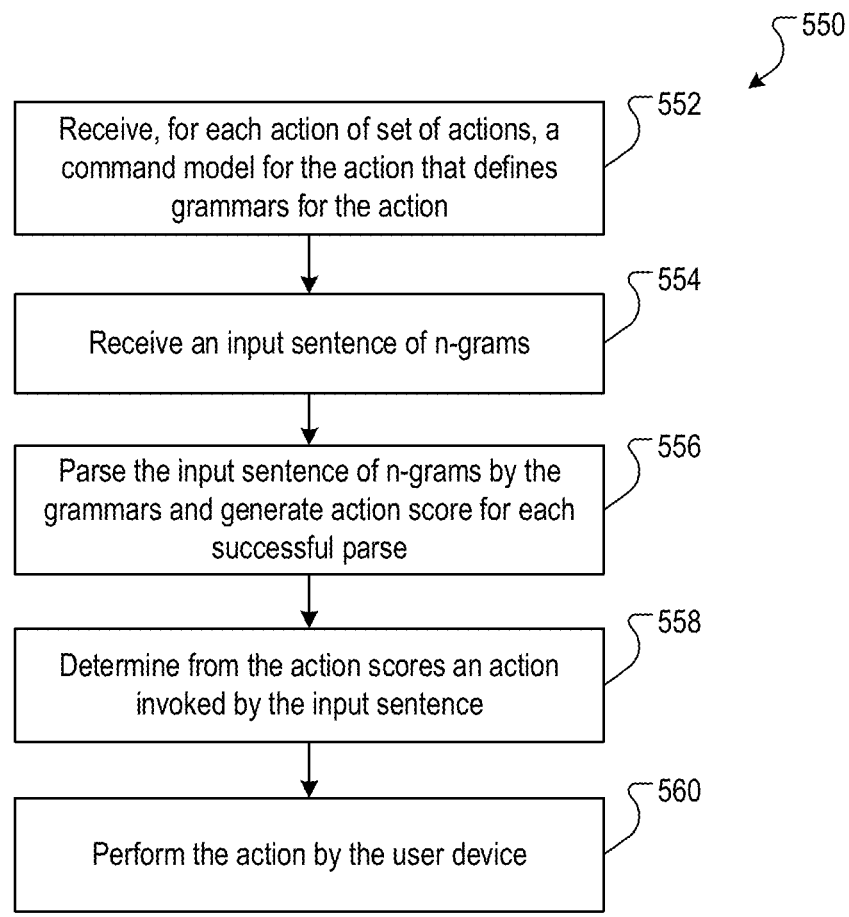
FIG. 6 is a flow diagram of an example process 500 for parsing an input sentence using the parsing rules.

The updated parsing rules are then persisted to the command models data 132. The command model data 132 is provided to user devices that use the command model data to parse input commands, such as voice input commands. FIG. 6 is a flow diagram of an example process 550 for parsing an input sentence using the parsing rules. The example process is implemented in a user device.

The process 550 receives, for each action of set of actions, a command model for the action that defines grammars for the action (552). For example, the process 550 may cause the user device to query the language processing system 110 for the command model data 132, and receives the command model data 132 sent in response to the request.

The process 550 receives an input sentence of n-grams (554). For example, a user of the user device may speak a voice command (or type in a command) in an attempt invoke a particular action. The voice data is processed to generate language text of n-grams that can be parsed and scored by the command models stored in the command models data 132.

The process 550 parses the input sentence of n-grams by the grammars and generates an action score for each successful parse (556). For each grammar for each action, the user device, using the data provided in the command model data 132, parses the input sentence. In some implementations, the user device parses using a bottom-up parse. Other parsing techniques, such as a top down parse, can also be used, however.

For each grammar that consumes the entire input sentence, a successful parse is determined. For example, for the input sentence:

Text to Page that I just left work and will be home in 30 minutes the grammar with the rule S→Text to <Recipient> that <Message> would consume the input sentence. The yield of the <Recipient> non-terminal is "Page" and the yield of the message non-terminal is "I just left work and will be home in 30 minutes."

For each grammar that successfully parses the input sentence, an action score is determined. For example, the command models can be configured to generate, or facilitate the generation of, an action score according to any appropriate scoring algorithm. In some implementations, the action score may be based on a semantic score that is a measure of semantic meaning for the grammar for which there is a successful parse. For example, the semantic score may be based on the arguments of the semantic yields for each non-terminal being arguments that belong to a category defined by the non-terminal. To illustrate, for the command input sentence "Text to Page that I just left work and will be home in 30 minutes," the semantic score will be relative high as the semantic yield of the non-terminal <Recipient> is a recipient in an address book on the user device, and the semantic yield of the non-terminal <Message> appears to be a terms that do not invoke other actions.

Conversely, consider the sentence "Text to Empire State Building that What are your observation deck hours." Here, the semantic score would be relatively low, because the terms <Empire State Building> do not correspond to an actual recipient contact. Instead, the Empire State Building is a non-recipient entity.

The scoring processes described above are examples of several appropriate scoring techniques that can be used. Other appropriate scoring techniques can also be used, however.

The process 550 determines from the action score an action invoked by the input sentence (558). For example, the process 550 will select the grammar with the highest action score, and the action corresponding to the grammar will be selected. For example, for the two grammars described above, the start symbol corresponding to the voice memo has the highest action score, and thus the voice memo action is selected.

The process 550 causes the user device to perform the action (560). For example, because the voice memo action is selected, the process invokes a voice memo application and records the audio corresponding to the text "Julia we have a party tomorrow and I need you to pick up cupcakes."

FIG. 6 is a block diagram of example mobile computing device. In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

The mobile computing device 610 may include other applications, computing sub-systems, and hardware. A voice recognition service 672 may receive voice communication data received by the mobile computing device's microphone 622, and translate the voice communication into corresponding textual data or perform voice recognition. The processed voice data can be input to the command models stored in the command models data 132 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 610 to the network 660 to enable communication between the mobile computing device 610 and other computing systems that provide services 660. The services 660 may be provided over different networks (e.g., the service provider's internal network, the Public Switched Telephone Network, and the Internet). The service provider may operate a server system that routes information packets and voice data between the mobile computing device 610 and computing systems associated with the services 660.

An application store 666 may provide a user of the mobile computing device 610 the ability to browse a list of remotely stored application programs that the user may download over the network and install on the mobile computing device 610. The application store 666 may serve as a repository of applications developed by third-party application developers. An application program that is installed on the mobile computing device 610 may be able to communicate over the network with server systems that are designated for the application program. For example, a VoIP application program may be downloaded from the Application Store 666, enabling the user to communicate with the VoIP service 664.

The mobile computing device 610 may access content on the internet 668 through network. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through the network. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program.

Mapping service 680 can provide the mobile computing device 610 with street maps, route planning information, and satellite images. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
accessing command sentences stored in a data store, wherein each command sentence is a set of n-grams that constitute the command sentence and each command sentence includes a plurality of n-grams, wherein the command sentences include n-grams that collectively map to a plurality of n-gram types;
for each of the n-gram types:
identifying n-gram spans, each n-gram span being a proper subset of a set of n-grams that constitute a command sentence and including first n-grams of the n-gram type and one or more second n-grams that do not map to any of the plurality of n-gram types;
determining clusters of the n-gram spans, each cluster including n-gram spans meeting a measure of similarity of n-grams spans that belong to the cluster; and
for each cluster of n-gram spans, determining, from the n-gram spans belonging to the cluster, a new type to which the n-grams of the n-gram spans map.

2. The computer-implemented method of claim 1, further comprising accessing sets of parsing rules associated with respective actions, each respective set of parsing rules associated with one respective action, each action defining a user device operation that is different from user device operations for each other action, the parsing rules defining n-grams of each of the n-n-gram types and n-grams that are not of the n-gram types; and
wherein identifying n-gram spans comprises identifying the proper subset of n-grams consumed by a parsing rule.

3. The computer-implemented method of claim 2, wherein determining clusters of the n-gram spans for each of the n-gram types comprises:
selecting pairs of n-grams spans;
determining a similarity measure for each pair of n-gram spans, each similarity measure being a measure of similarity of the n-gram spans in the pair of n-grams spans to each other; and
clustering the n-gram spans based on the similarity measures.

4. The computer-implemented method of claim 3, wherein clustering the n-gram spans based on the similarity measures comprises:
iteratively selecting pairs of n-gram spans in an order according to their respective similarity measures until a convergence condition is met;
after each iterative selection:
determining whether any of the n-gram spans belonging to the pair of n-gram spans belong to a cluster;
for each pair of n-gram spans for which none of the n-gram spans of the pair belong to a cluster, creating a cluster the includes the n-gram spans;
for each pair of n-gram spans for which only one of the n-gram spans belong to a cluster, adding the other n-gram span of the pair to the cluster; and
for each pair of n-gram spans for which one of the n-gram spans belong to a first cluster and the other of the n-gram spans belong to a second cluster, merging the first and second clusters.

5. The computer-implemented method of claim 3, wherein determining a similarity measure for each pair of n-gram spans comprises:
determining the similarity measure, in part, based on a frequency of contextual co-occurrence of the n-gram spans in the command sentences.

6. The computer-implemented method of claim 3, wherein determining a similarity measure for each pair of n-gram spans comprises:
determining the similarity measure, in part, based on a frequency of action co-occurrence of the n-gram spans in the command sentences, the frequency of action co-occurrence being for an action and derived from only command sentences that are associated with the action.

7. The computer-implemented method of claim 1, wherein determining clusters of the n-gram spans for each of the non-terminal types, comprises:
selecting pairs of n-grams spans;
determining a similarity measure for each pair of n-gram spans, each similarity measure being a measure of similarity of the n-gram spans in the pair of n-grams spans to each other; and
clustering the n-gram spans based on the similarity measures.

8. The computer-implemented method of claim 7, wherein clustering the n-gram spans based on the similarity measures comprises:
iteratively selecting pairs of n-gram spans in an order according to their respective similarity measures until a convergence condition is met;
after each iterative selection:
determining whether any of the n-gram spans belonging to the pair of n-gram spans belong to a cluster;
for each pair of n-gram spans for which none of the n-gram spans of the pair belong to a cluster, creating a cluster the includes the n-gram spans;
for each pair of n-gram spans for which only one of the n-gram spans belong to a cluster, adding the other n-gram span of the pair to the cluster; and
for each pair of n-gram spans for which one of the n-gram spans belong to a first cluster and the other of the n-gram spans belong to a second cluster, merging the first and second clusters.

9. A non-transitory computer readable storage medium storing instructions executable by a data processing apparatus and upon such execution cause the data processing to perform operations comprising:
accessing command sentences stored in a data store, wherein each command sentence is a set of n-grams that constitute the command sentence and each command sentence includes a plurality of n-grams, wherein the command sentences include n-grams that collectively map to a plurality of n-gram types;
for each of the n-gram types:
identifying n-gram spans, each n-gram span being a proper subset of a set of n-grams that constitute a command sentence and including first n-grams of the n-gram type and one or more second n-grams that do not map to any of the plurality of n-gram types;
determining clusters of the n-gram spans, each cluster including n-gram spans meeting a measure of similarity of n-grams spans that belong to the cluster; and
for each cluster of n-gram spans, determining, from the n-gram spans belonging to the cluster, a new type to which the n-grams of the n-gram spans map.

10. The computer-implemented method of claim 9, further comprising accessing sets of parsing rules associated with respective actions, each respective set of parsing rules associated with one respective action, each action defining a user device operation that is different from user device operations for each other action, the parsing rules defining n-grams of each of the n-n-gram types and n-grams that are not of the n-gram types; and wherein identifying n-gram spans comprises identifying the proper subset of n-grams consumed by a parsing rule.

11. The computer-implemented method of claim 10, wherein determining clusters of the n-gram spans for each of the n-gram types comprises:

selecting pairs of n-grams spans;

determining a similarity measure for each pair of n-gram spans, each similarity measure being a measure of similarity of the n-gram spans in the pair of n-grams spans to each other; and clustering the n-gram spans based on the similarity measures.

12. The computer-implemented method of claim 11, wherein clustering the n-gram spans based on the similarity measures comprises:

iteratively selecting pairs of n-gram spans in an order according to their respective similarity measures until a convergence condition is met;

after each iterative selection:

determining whether any of the n-gram spans belonging to the pair of n-gram spans belong to a cluster;

for each pair of n-gram spans for which none of the n-gram spans of the pair belong to a cluster, creating a cluster the includes the n-gram spans;

for each pair of n-gram spans for which only one of the n-gram spans belong to a cluster, adding the other n-gram span of the pair to the cluster; and for each pair of n-gram spans for which one of the n-gram spans belong to a first cluster and the other of the n-gram spans belong to a second cluster, merging the first and second clusters.

13. The computer-implemented method of claim 11, wherein determining a similarity measure for each pair of n-gram spans comprises:

determining the similarity measure, in part, based on a frequency of contextual co-occurrence of the n-gram spans in the command sentences.

14. The computer-implemented method of claim 11, wherein determining a similarity measure for each pair of n-gram spans comprises:

determining the similarity measure, in part, based on a frequency of action co-occurrence of the n-gram spans in the command sentences, the frequency of action co-occurrence being for an action and derived from only command sentences that are associated with the action.

15. The computer-implemented method of claim 9, wherein determining clusters of the n-gram spans for each of the non-terminal types, comprises:

selecting pairs of n-grams spans;

determining a similarity measure for each pair of n-gram spans, each similarity measure being a measure of similarity of the n-gram spans in the pair of n-grams spans to each other; and clustering the n-gram spans based on the similarity measures.

16. The computer-implemented method of claim 15, wherein clustering the n-gram spans based on the similarity measures comprises:

iteratively selecting pairs of n-gram spans in an order according to their respective similarity measures until a convergence condition is met;

after each iterative selection:

determining whether any of the n-gram spans belonging to the pair of n-gram spans belong to a cluster;

for each pair of n-gram spans for which none of the n-gram spans of the pair belong to a cluster, creating a cluster the includes the n-gram spans;

for each pair of n-gram spans for which only one of the n-gram spans belong to a cluster, adding the other n-gram span of the pair to the cluster; and for each pair of n-gram spans for which one of the n-gram spans belong to a first cluster and the other of the n-gram spans belong to a second cluster, merging the first and second clusters.

17. A system, comprising:

a data processing apparatus; and a non-transitory computer readable storage medium in data communication with the data processing apparatus and storing instructions executable by the data processing apparatus and upon such execution cause the data processing to perform operations comprising:

accessing command sentences stored in a data store, wherein each command sentence is a set of n-grams that constitute the command sentence and each command sentence includes a plurality of n-grams, wherein the command sentences include n-grams that collectively map to a plurality of n-gram types;

for each of the n-gram types:

identifying n-gram spans, each n-gram span being a proper subset of a set of n-grams that constitute a command sentence and including first n-grams of the n-gram type and one or more second n-grams that do not map to any of the plurality of n-gram types;

determining clusters of the n-gram spans, each cluster including n-gram spans meeting a measure of similarity of n-grams spans that belong to the cluster; and for each cluster of n-gram spans, determining, from the n-gram spans belonging to the cluster, a new type to which the n-grams of the n-gram spans map.

* * * * *